US012676697B2

(12) United States Patent
Meyers

(10) Patent No.: US 12,676,697 B2
(45) Date of Patent: Jul. 7, 2026

(54) DUTY-CYCLE INVARIANT RECEIVER AND METHOD FOR RECEIVING

(71) Applicant: SEMICONDUCTOR COMPONENTS INDUSTRIES, LLC, Scottsdale, AZ (US)

(72) Inventor: Manuel Hortensia L. Meyers, Leuven (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 1 day.

(21) Appl. No.: 18/920,510

(22) Filed: Oct. 18, 2024

(65) Prior Publication Data

US 2026/0113143 A1     Apr. 23, 2026

(51) Int. Cl.
H04L 1/00 (2006.01)
H04L 12/40 (2006.01)

(52) U.S. Cl.
CPC ............ H04L 1/0036 (2013.01); H04L 12/40 (2013.01); H04L 12/40013 (2013.01); *H04L 2012/40215* (2013.01); *H04L 2012/40273* (2013.01)

(58) Field of Classification Search
CPC ..... H04L 1/0036; H04L 1/0047; H04L 12/40; H04L 12/40013; H04L 12/40019; H04L 2012/40215; H04L 2012/40273

USPC ............... 375/219, 257, 316, 318, 328, 361; 455/230, 231, 345
See application file for complete search history.

(56) References Cited

U.S. PATENT DOCUMENTS

| | | | |
|---|---|---|---|
| 2004/0075462 A1 | 4/2004 | Kizer et al. | |
| 2015/0042299 A1* | 2/2015 | Li | H02M 3/1588 323/271 |
| 2016/0013769 A1* | 1/2016 | Lee | H02J 7/00712 320/108 |
| 2017/0194947 A1 | 7/2017 | Wei | |
| 2020/0162065 A1 | 5/2020 | Wang et al. | |
| 2024/0120937 A1* | 4/2024 | Fan | H03M 1/468 |

FOREIGN PATENT DOCUMENTS

| | | | | |
|---|---|---|---|---|
| CN | 112187596 B | * 10/2023 | ............. | H04L 12/40 |
| DE | 102006043310 A1 | 5/2007 | | |

* cited by examiner

*Primary Examiner* — Young T. Tse

(74) *Attorney, Agent, or Firm* — Dickinson Wright PLLC; Jonathan A. Schnayer

(57) ABSTRACT

Receivers, control systems, and methods for receiving a signal. The method includes receiving a differential communication signal including a first component and a second component. The method also includes generating, with a comparator, a comparison signal by comparing the first component and the second component. The method further includes generating a single-ended communication signal by applying a debouncing time to the comparison signal. The method also includes inverting a voltage offset of the comparator based on the single-ended communication signal.

19 Claims, 9 Drawing Sheets

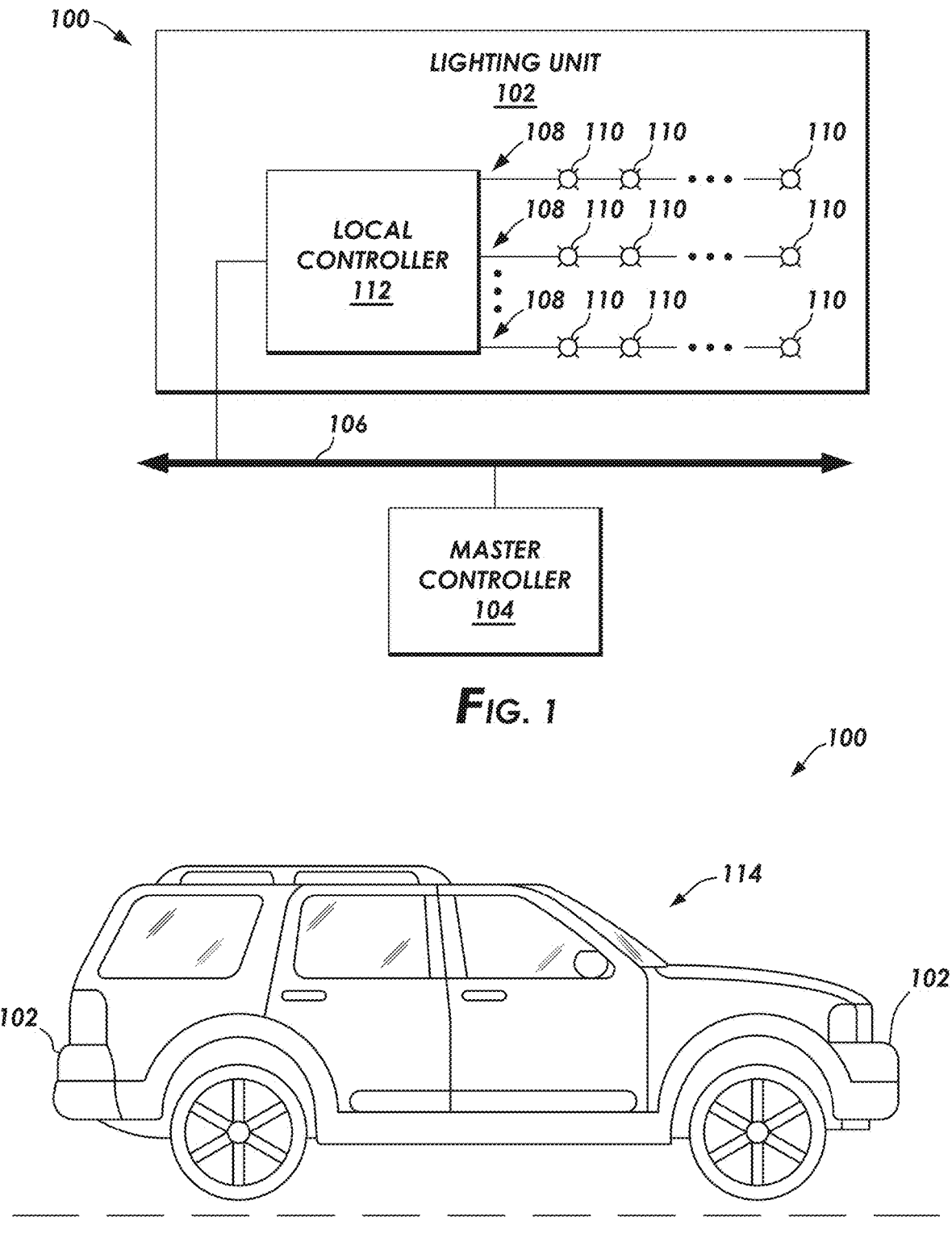
*F*IG. 1
*F*IG. 2

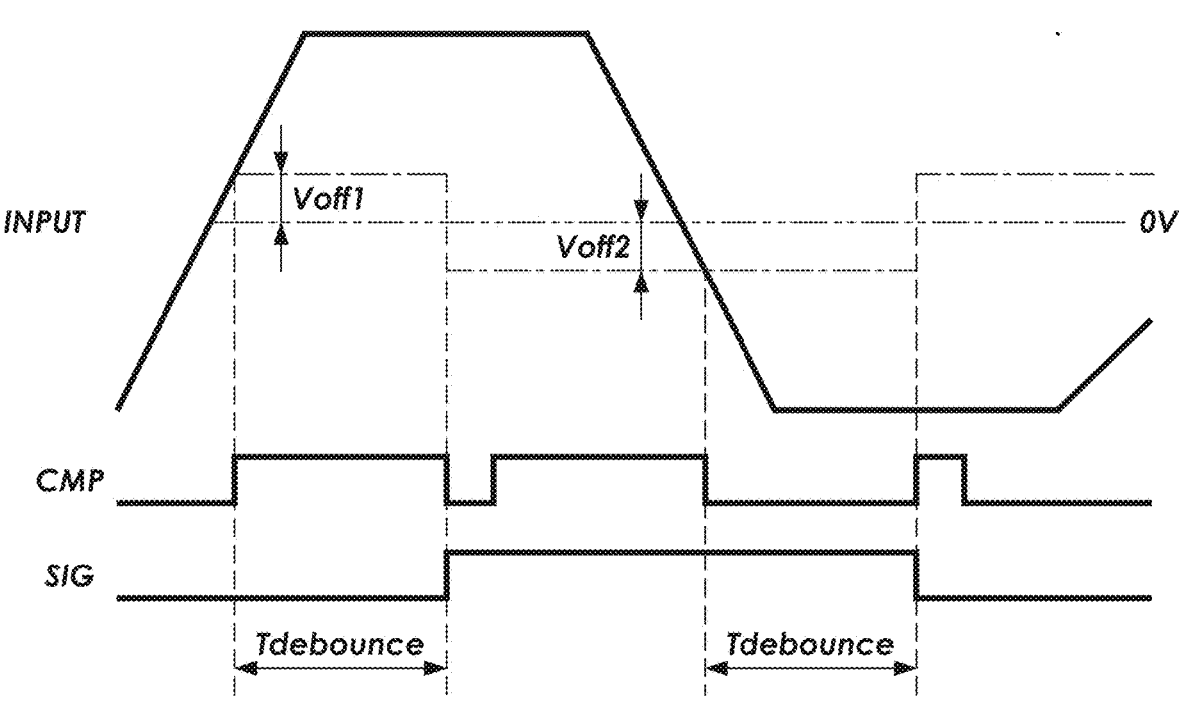
*F*IG. 8A
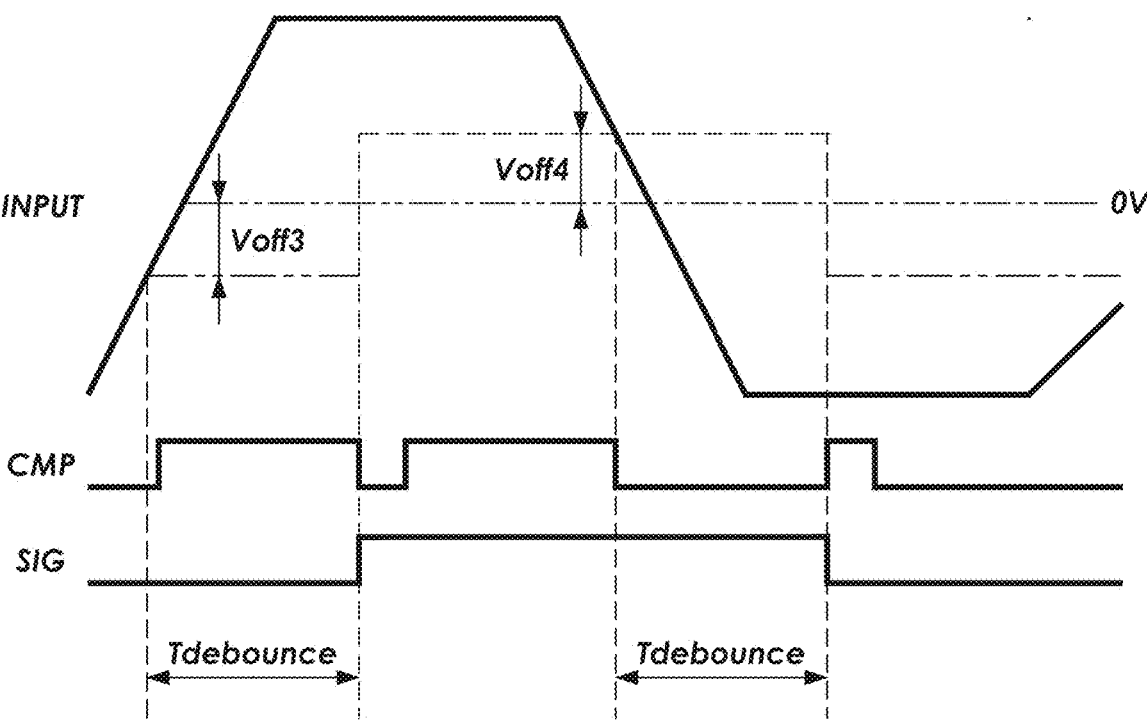
*F*IG. 8B

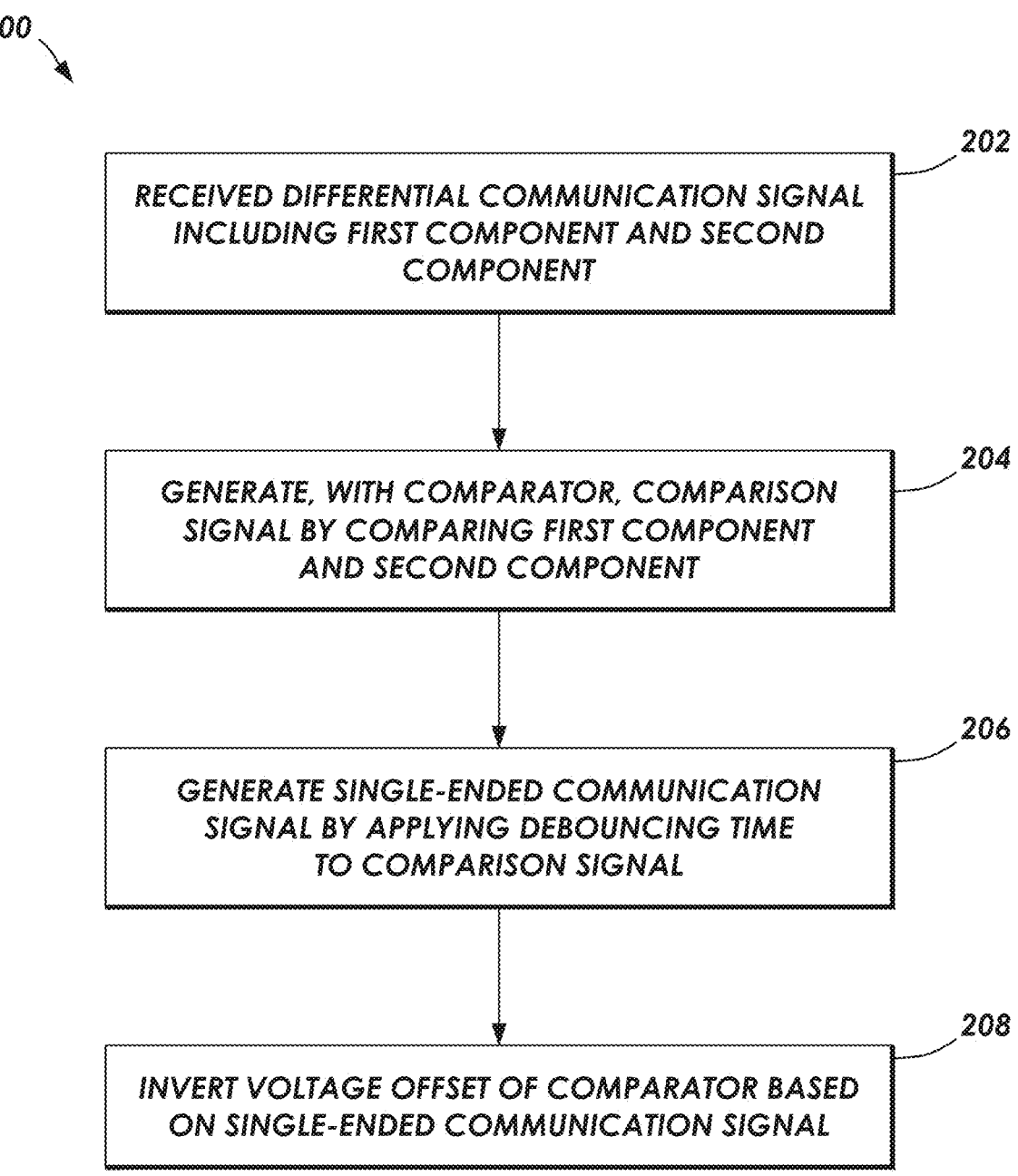

*200*

*202*

RECEIVED DIFFERENTIAL COMMUNICATION SIGNAL INCLUDING FIRST COMPONENT AND SECOND COMPONENT

*204*

GENERATE, WITH COMPARATOR, COMPARISON SIGNAL BY COMPARING FIRST COMPONENT AND SECOND COMPONENT

*206*

GENERATE SINGLE-ENDED COMMUNICATION SIGNAL BY APPLYING DEBOUNCING TIME TO COMPARISON SIGNAL

*208*

INVERT VOLTAGE OFFSET OF COMPARATOR BASED ON SINGLE-ENDED COMMUNICATION SIGNAL

*FIG. 9*

DUTY-CYCLE INVARIANT RECEIVER AND METHOD FOR RECEIVING

BACKGROUND

In modular lighting systems, a master control device may be connected to a number of local control devices through a daisy chain arrangement. Each local control device may control a number of light branches. Time based encoding may be used in the communication protocol for controlling the intensity of the light branches. For example, (differential) Manchester encoding is used in automotive communication protocols because of its noise immunity and ability to operate in harsh environments. Each local control device includes a comparator for converting a received differential signal into a single-ended signal that may be decoded. The comparator has a voltage offset that, combined with the transition time of the input signal, introduces duty cycle distortion into the single-ended signal. This duty cycle distortion may lead to decoding errors.

SUMMARY

Reducing (or eliminating) duty cycle distortion in automotive communication signals is difficult due to various requirements for automotive systems. For example, the transition time of an automotive communication signal may be shortened to reduce duty cycle distortion. However, such shorter transition times may result in a higher emission spectrum that violates emission requirements for automotive systems. As a further example, the amplitude of an automotive communication signal may be increased to reduce duty cycle distortion. However, such increased amplitude is not compatible with minimal supply requirements for automotive systems. The present disclosure provides receivers, control systems, and methods for receiving a signal that, among other things, avoid duty cycle distortion by inverting a voltage offset of a comparator based on a debounced version of the comparator output. Duty cycle distortion results from the comparator tripping at different transition magnitudes for rising and falling transitions of the input. Inverting the voltage offset of the comparator for falling transitions of the input causes the comparator to trip at the same transition magnitude for both rising and falling transitions of the input. Thus, avoiding duty cycle distortion. The debounced version of the comparator output is used to determine when to invert the voltage offset because that version provides an accurate indication of whether the next transition of the input is falling or rising.

The present disclosure provides a method for receiving a signal. The method includes receiving a differential communication signal including a first component and a second component. The method also includes generating, with a comparator, a comparison signal by comparing the first component and the second component. The method further includes generating a single-ended communication signal by applying a debouncing time to the comparison signal. The method also includes inverting a voltage offset of the comparator based on the single-ended communication signal.

The present disclosure also provides a receiver including, in one implementation, a first input terminal, a second input terminal, a comparator, a debouncer, and an offset inverter. The first input terminal is for receiving a first component of a differential communication signal. The second input terminal is for receiving a second component of the differential communication signal. The comparator is configured to generate a comparison signal by comparing the first component and the second component of the differential communication signal. The debouncer is configured to generate a single-ended communication signal by applying a debouncing time to the comparison signal. The offset inverter is configured to couple the first input terminal to a first or a second of two inputs of the comparator based on the single-ended communication signal. The offset inverter is also configured to couple the second input terminal to the first or the second of the two inputs of the comparator based on the single-ended communication signal. The offset inverter is further configured to invert the comparison signal based on the single-ended communication signal.

The present disclosure further provides a system including, in one implementation, a master controller, a communication bus, and a local controller. The master controller is configured to send a differential communication signal. The local controller is communicably coupled to the master controller via the communication bus. The local controller is configured to receive the differential communication signal. The local controller is also configured to generate, with a comparator, a comparison signal by comparing a first component of the differential communication signal and a second component of the differential communication signal. The local controller is further configured to generate a single-ended communication signal by applying a debouncing time to the comparison signal. The local controller is also configured to invert a voltage offset of the comparator based on the single-ended communication signal.

BRIEF DESCRIPTION OF THE DRAWINGS

For a detailed description of example implementations, reference will now be made to the accompanying drawings in which:

FIG. 1 is a block diagram of an example of a lighting system in accordance with some implementations;

FIG. 2 is a diagram of an example of a lighting system incorporated in a vehicle in accordance with some implementations;

FIG. 8A is a plot of examples of a comparison signal generated by a comparator with a positive voltage offset and a corresponding single-ended communication signal generated by a debouncer in accordance with some implementations;

FIG. 8B is a plot of examples of a comparison signal generated by a comparator with a negative voltage offset and a corresponding single-ended communication signal generated by a debouncer in accordance with some implementations;

FIG. 9 is a flow diagram of an example of a method for receiving a signal in accordance with some implementations.

DEFINITIONS

Figure 3:
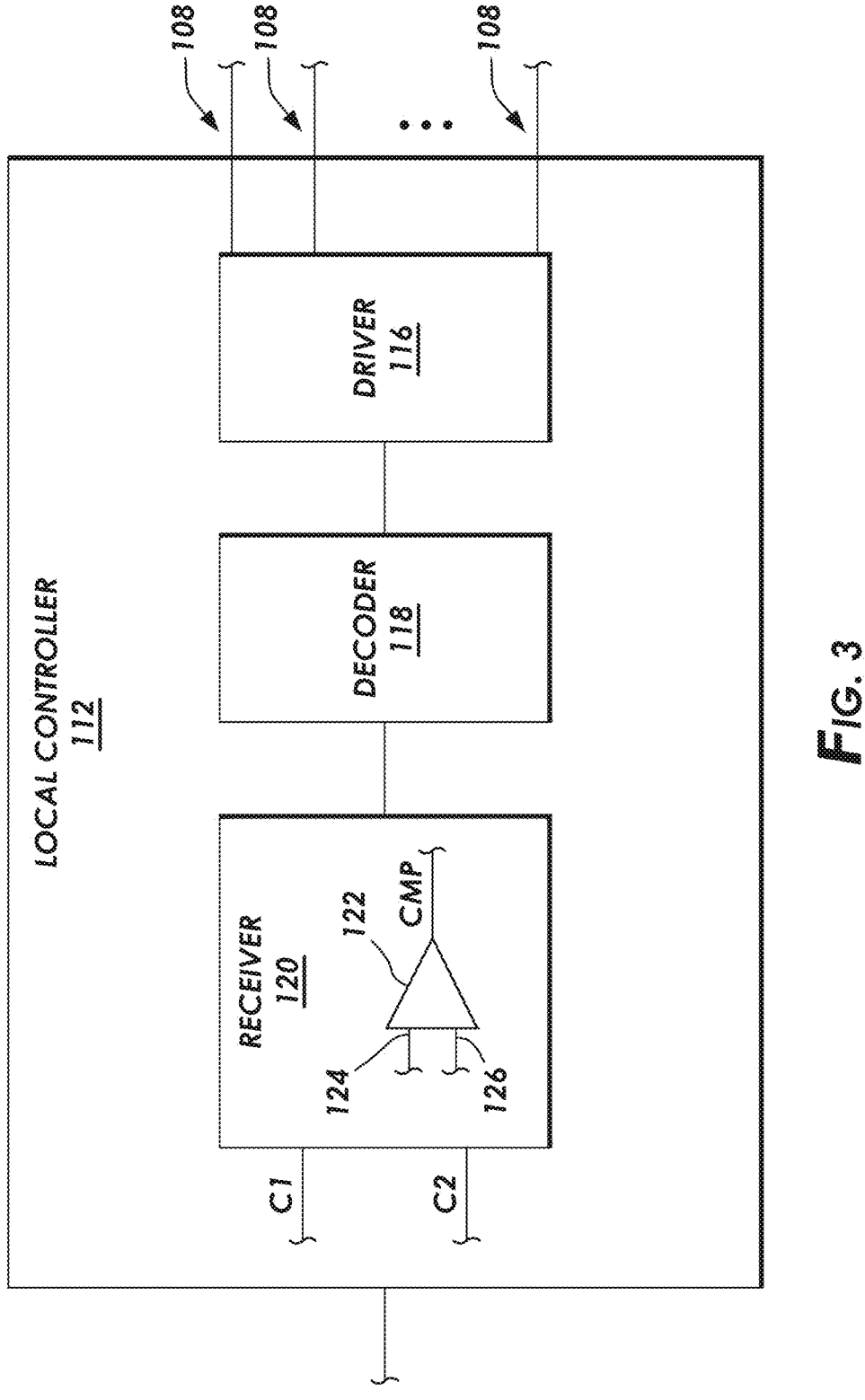
FIG. 3 is a block diagram of an example of a local controller in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate that the recited referent may be plural.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

"About" in reference to a recited parameter shall mean the recited parameter plus or minus ten percent (+/−10%) of the recited parameter.

"Assert" shall mean creating or maintaining a first predetermined state of a Boolean signal. Boolean signals may be asserted high or with a higher voltage, and Boolean signals may be asserted low or with a lower voltage, at the discretion of the circuit designer. Similarly, "de-assert" shall mean creating or maintaining a second predetermined state of the Boolean, opposite the asserted state.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to receivers, control systems, and methods for receiving a signal. More particularly, at least some examples are directed to receiving communication signals with time based encoding. More particularly still, various examples are directed to avoiding duty cycle distortion by inverting a voltage offset of a comparator based on a debounced version of the comparator output. The specification now turns to an example system to orient the reader.

FIG. 1 is a block diagram of an example of a lighting system 100. The lighting system 100 illustrated in FIG. 1 includes a lighting unit 102, a master controller 104, and a communication bus 106. The lighting system 100 may include fewer components, additional components, or different components in different configurations than the lighting system 100 illustrated in FIG. 1. In some implementations, the lighting system 100 includes multiple instances of the lighting unit 102 illustrated in FIG. 1. For example, the lighting system 100 may include a plurality of lighting units coupled to the communication bus 106. In some implementations, the lighting system 100 includes multiple instances of the communication bus 106 illustrated in FIG. 1. For example, the lighting system 100 may include a plurality of communication busses coupling a plurality of lighting units in a daisy chain arrangement. The lighting unit 102 illustrated in FIG. 1 includes a plurality of light branches 108. Each of the plurality of light branches 108 includes a plurality of light sources 110 coupled in a series configuration. The plurality of light sources 110 may include light-emitting diodes (LEDs) or other types of light sources. The lighting unit 102 illustrated in FIG. 1 also includes a local controller 112. The local controller 112 is coupled to the plurality of light branches 108 to drive the plurality of light sources 110. The local controller 112 is communicably coupled to the master controller 104 via the communication bus 106. In some implementations, the communication bus 106 is a controller area network (CAN) bus. The master controller 104 is configured to send a communication signal to the local controller 112 via the communication bus 106. The local controller 112 is configured to drive the plurality of light sources 110 based on timing and intensity commands included in the communication signal sent by the master controller 104.

FIG. 2 shows another example of the lighting system 100. The lighting system 100 illustrated in FIG. 2 comprises an automobile or vehicle 114. The vehicle 114 is illustratively shown as a passenger vehicle, but the lighting system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 2, the vehicle 114 includes a forward-looking lighting unit 102 arranged to illuminate the area in front of the vehicle 114. The vehicle 114 further comprises a backward-looking lighting unit 102 arranged to illuminate the area behind the vehicle 114. In situations in which the lighting system 100 is a vehicle, the master controller 104 may be a controller of the vehicle 114. The discussion now turns in greater detail to the local controller 112. The vehicle 114 may include additional lighting units (not illustrated). For example, the vehicle 114 may include one or more side-looking lighting units, one or more interior lighting units, or a combination thereof.

FIG. 3 shows an example of the local controller 112. The local controller 112 illustrated in FIG. 3 includes a driver 116, a decoder 118, and a receiver 120. The local controller 112 may include fewer components, additional components, or different components in different configurations than the local controller 112 illustrated in FIG. 3. The driver 116 is coupled to plurality of light sources 110 via the plurality light branches 108. The driver 116 is configured to drive the plurality of light sources 110. For example, the driver 116 may include pulse-width modulators or other circuitry for generating signals to operate the plurality of light sources 110. The driver 116 drives the plurality of light sources 110 based on timing and intensity commands included in a communication signal sent by the master controller 104.

Figure 4:
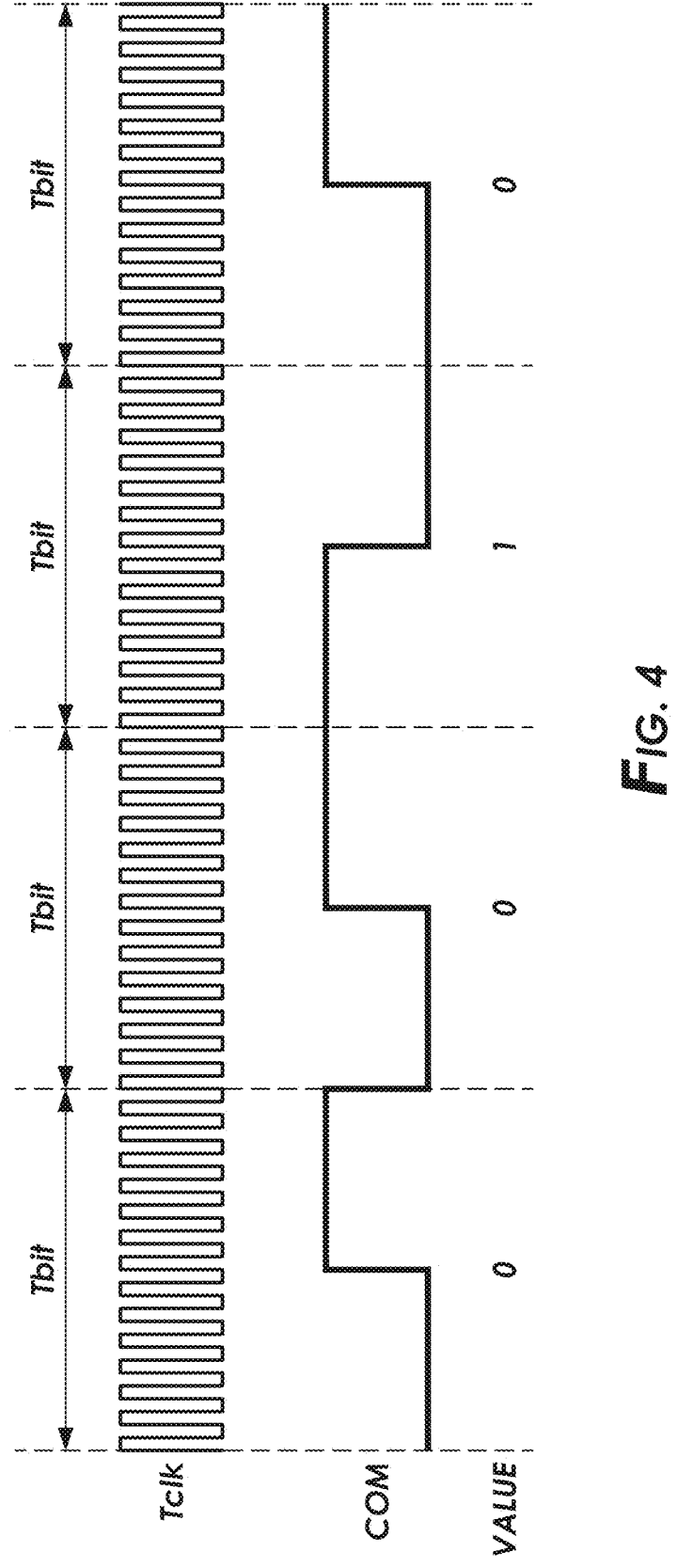
FIG. 4 is a timing diagram of an example of a Manchester encoded signal and a clock signal in accordance with some implementations.

The decoder 118 is configured to decode the communication signal sent by the master controller 104. In some implementations, the communication signal is time based encoded. For example, the communication signal may be Manchester encoded (also known as phase encoded). Manchester code is a line code in which the encoding of each data bit is either low then high or high then low, for equal time. The decoding principle is based on detecting transitions and the timing between successive transitions, including deciding if a midpoint is detected. For example, in the timing diagram of FIG. 4, the leftmost transition of the communication signal COM is from low-to-high which indicates a value of logic zero. Further, in FIG. 4, the third transition of the communication signal COM is from high-to-low which indicates a value of logic one. Each transition of the communication signal COM occurs within a predetermined number of clock periods of a clock signal Tclk. For example, each transition of the communication signal COM may occur within thirty clock periods of the clock signal Tclk. The predetermined number of clock periods defines a Tbit. For example, the Tbit may be one microsecond. The decoder 118 tracks the number of clock periods of the clock signal Tclk between transitions of the communication signal COM using one or more counters. Further, the decoder 118 determines whether a transition of the communication signal COM is from high-to-low or from low-to-high based on the whether the number of clock periods from the previous transition of the communication signal COM is about equal to one-half of the Tbit or one Tbit.

Briefly returning to FIG. 3, the communication signal sent by the master controller 104 is a differential communication signal that includes a first component C1 and a second component C2. As illustrated in FIG. 3, the receiver 120 receives the first component C1 and the second component C2 of the differential communication signal. The receiver 120 includes a comparator 122 that receives the first component C1 and the second component C2 of the differential communication signal at a first input 124 and a second input 126 of the comparator 122. The comparator 122 generates a comparison signal CMP by comparing the first component C1 and the second component C2 of the differential communication signal.

Figure 5A:
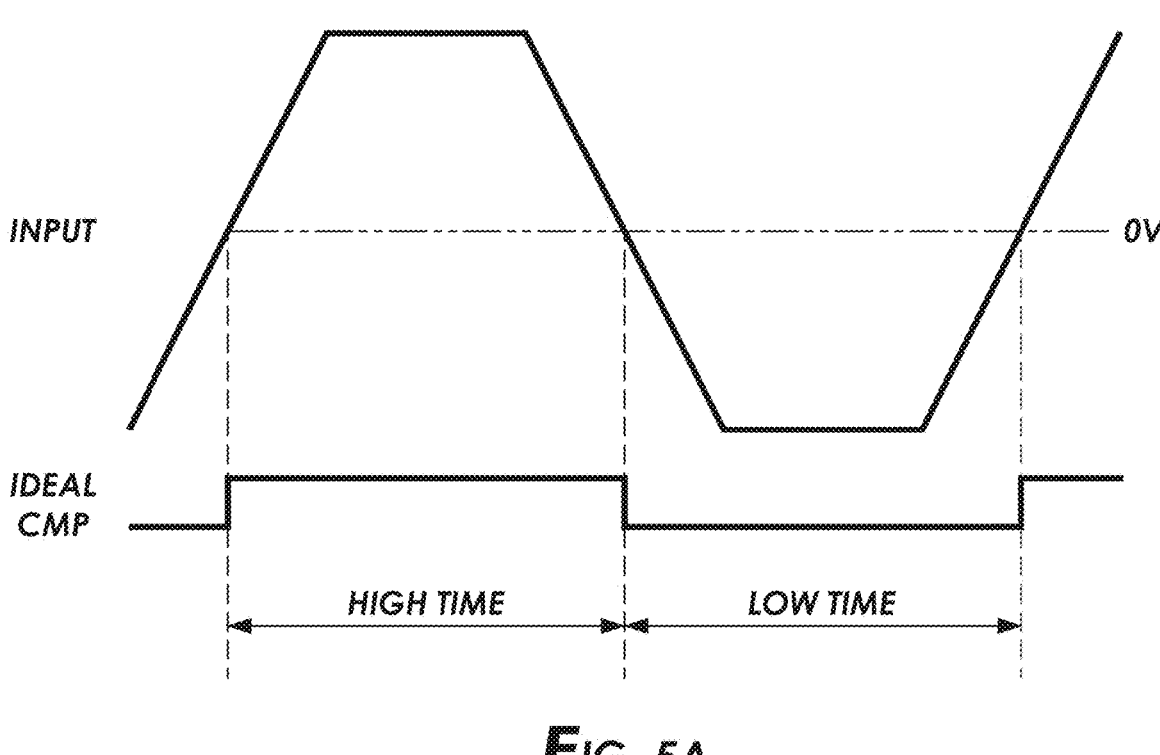
FIG. 5A is a plot of an example of an ideal output of a comparator in accordance with some implementations.
Figure 5B:
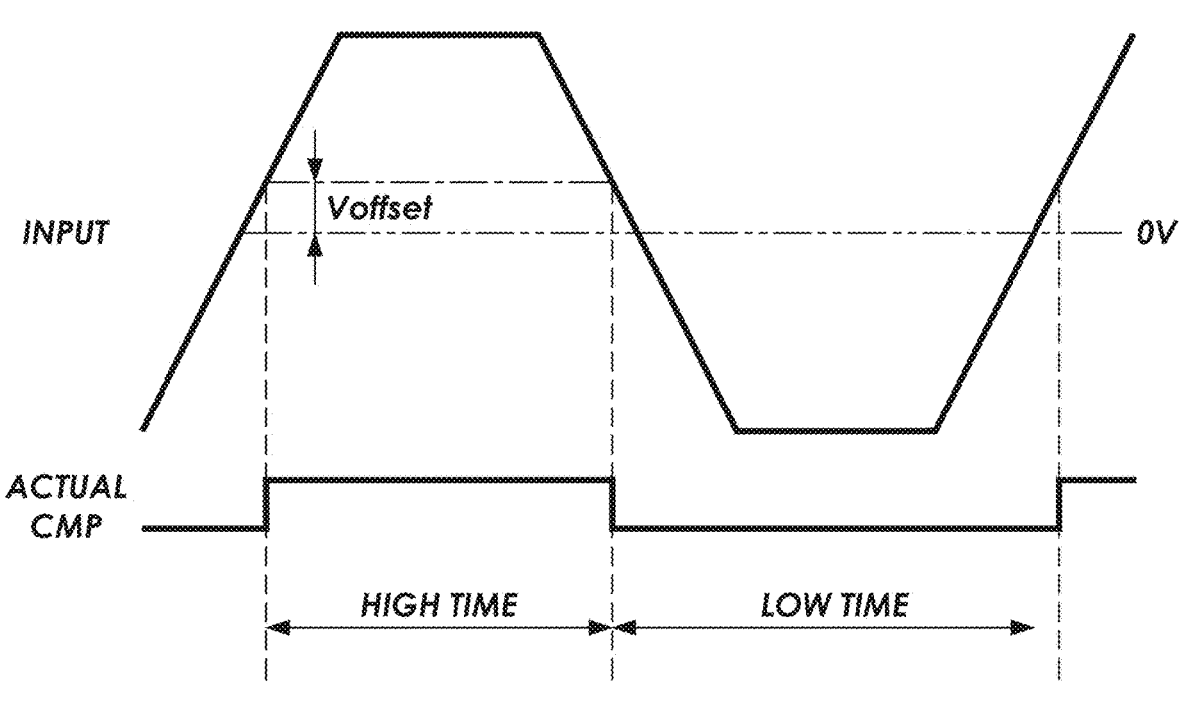
FIG. 5B is a plot of an example of an actual output of a comparator in accordance with some implementations.

FIG. 5A is a plot of an example of an ideal output generated by the comparator 122. The input illustrated in FIG. 5A is the voltage difference between the first component C1 and the second component C2. As illustrated in FIG. 5A, the high time of the ideal output of the comparator 122 is approximately equal to the low time of the ideal output of the comparator 122. In other words, the high time and the low time each have a duty cycle of 50%. The 50% duty cycle illustrated in FIG. 5A occurs because the ideal output of the comparator 122 toggles when the input crosses through a threshold of approximately zero volts. However, real-world implementations of the comparator 122 show offset with value Voffset and toggle when the input crosses through a voltage threshold that is a Voffset above or a Voffset below zero volts. For example, FIG. 5B is a plot of an actual output generated by the comparator 122. As illustrated in FIG. 5B, the actual output of the comparator 122 toggles when the input crosses through a voltage threshold that is greater than zero volts. The voltage difference between the actual voltage at which the comparator 122 toggles and the ideal voltage is called the voltage offset Voffset of the comparator 122. The voltage offset Voffset of the comparator 122 causes a discrepancy between the high time and the low time of the output of the comparator 122. For example, as further illustrated in FIG. 5B, the high time of the actual output of the comparator 122 is shorter than the low time of the actual output of the comparator 122. The difference between the high time and the low time of the output of the comparator 122 in FIG. 5B is called duty cycle distortion. As described in more detail below, duty cycle distortion has a negative effect on decoding Manchester encoded communication signals.

As described above, the decoder 118 tracks the number of clock periods of the clock signal Tclk between transitions of the communication signal. The decoder 118 determines whether a transition of the communication signal is from high-to-low or from low-to-high based on the general assumption that the communication signal will be at a lower voltage value for about half of the clock periods during a Tbit and at a higher voltage value for the other half of the clock periods during the Tbit. However, duty cycle distortion may cause the communication signal to be at the lower voltage value or the higher voltage value for more than half of the clock periods during a Tbit. As a consequence, the decoder 118 may incorrectly decode the communication signal due to the presence of duty cycle distortion. The discussion now turns in greater detail to the receiver 120 which is configured to prevent duty cycle distortion caused by the voltage offset Voffset of the comparator 122.

Figure 6:
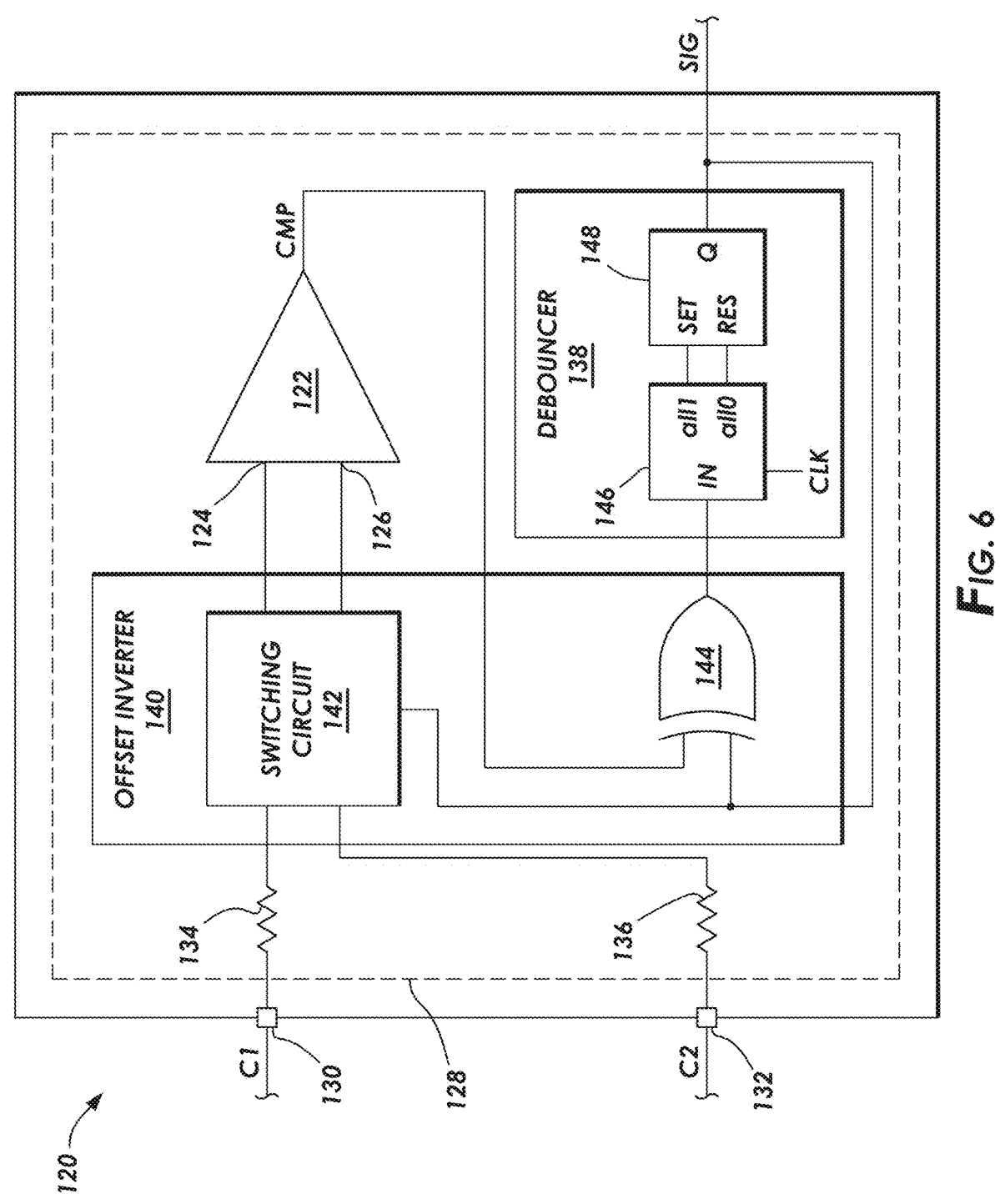
FIG. 6 is a partial block diagram and a partial schematic of an example of a receiver in accordance with some implementations.

FIG. 6 shows an example of the receiver 120. In particular, FIG. 6 shows that the receiver 120 may comprise a substrate 128 of semiconductor material, such as silicon, encapsulated within packaging to create a packaged semiconductor device or packaged semiconductor product. Bond pads or other connection points of the substrate 128 couple to terminals of the communication bus 106. The connections may comprise a first input terminal 130 for receiving the first component C1 of the differential communication signal, and a second input terminal 132 for receiving the second component C2 of the differential communication signal. Additional terminals will be present, such as ground, common, or power, but the additional terminals are omitted so as not to unduly complicate the figure. While a single instance of the substrate 128 is shown, in other implementations, multiple substrates may be combined to form the receiver 120 in a multi-chip module created before or after singulation.

The receiver 120 illustrated in FIG. 6 includes the comparator 122, a first resistor 134, a second resistor 136, a debouncer 138, and an offset inverter 140. The receiver 120 may include fewer components, additional components, or different components in different configurations than the receiver 120 illustrated in FIG. 6. The first resistor 134 is coupled in series between the first input terminal 130 and the offset inverter 140. The second resistor 136 is coupled in series between the second input terminal 132 and the offset inverter 140. The first resistor 134 and the second resistor 136 condition the input signal to be compatible with the input ratings of the comparator 122. For example, the first resistor 134 and the second resistor 136 may take the common mode signal without attenuating the differential amplitude of the differential communication signal.

The debouncer 138 is configured to generate a single-ended communication signal SIG by applying a debouncing time Tdebounce to the comparison signal CMP, Tdebounce is the result of the product Tclk and the number of positions over which the signal is debounced. The debouncer 138 illustrated in FIG. 6 includes a debouncing circuit 146 and a set-reset flip-flop 148. The debouncer 138 may include fewer components, additional components, or different components in different configurations than the debouncer 138 illustrated in FIG. 6. The debouncing circuit 146 includes a plurality of cascading shift registers configured to generate an all1 signal (one example of a "first signal") or an all0 signal (an example of a "second signal") based on the comparison signal CMP. For example, the debouncing circuit 146 may generate the all1 signal when the comparison signal CMP is at a logic 1 value for longer than the debouncing time Tdebounce. Further, the debouncing circuit 146 may generate the all0 signal when the comparison signal CMP is at a logic 0 value for longer than the debouncing time Tdebounce. The set input of the set-reset flip-flop 148 is controlled by the all1 signal generated by the debouncing circuit 146. When the debouncing circuit 146 generates the all1 signal, the set-reset flip-flop 148 sets the single-ended communication signal SIG. For example, the set-reset flip-flop 148 may set the single-ended communication signal SIG to a logic 1 value when the debouncing circuit 146 generates the all1 signal. The reset input of the set-reset flip-flop 148 is controlled by the all0 signal generated by the debouncing circuit 146. When the debouncing circuit 146 generates the all0 signal, the set-reset flip-flop 148 resets the single-ended communication signal SIG. For example, the set-reset flip-flop 148 may set the single-ended communication signal SIG to a logic 0 value when the debouncing circuit 146 generates the all0 signal.

The debouncing circuit 146 applies a debouncing time Tdebounce to the comparison signal CMP. In some implementations, the debouncing time Tdebounce is set based on a predetermined slope of the differential communication signal and a maximum voltage offset of the comparator 122. For example, the debouncing time Tdebounce may be set to the maximum time needed for the input signal to exceed about two times the voltage offset Voffset of the comparator 122. The transition time of the input signal is predetermined based on the maximum capacitive load and output current driver capability of the master controller 104, which drives the communication bus 106. As illustrated in FIG. 6, the debouncing circuit 146 receives a clock signal CLK. The cascading shift registers are updated based on the clock signal CLK. For example, the cascading shift registers may be updated at each clock period of the clock signal CLK. In some implementations, the debouncing time Tdebounce is set based on the quantity of cascading shift registers included in the debouncing circuit 146 and the clock signal CLK. For example, the debouncing time Tdebounce may be set to the product of the clock period of the clock signal CLK and number of clock periods needed for each of the cascading shift registers to be set to the output value of the XOR gate 144 after the output value of the XOR gate 144 changes.

The offset inverter 140 is configured to couple the first input terminal 130 to the first input 124 or the second input 126 of the comparator 122 based on the single-ended communication signal SIG. For example, the offset inverter 140 illustrated in FIG. 6 includes a switching circuit 142 configured to couple the first input terminal 130 to the first input 124 of the comparator 122 when the single-ended communication signal SIG is at a first logic value (for example, a logic 1 value). Further, the switching circuit 142 couples the first input terminal 130 to the second input 126 of the comparator 122 when the single-ended communication signal CMP is at a second logic value (for example, a logic 0 value). The offset inverter 140 is also configured to couple the second input terminal 132 to the first input 124 or the second input 126 of the comparator 122 based on the single-ended communication signal SIG. For example, the switching circuit 142 illustrated in FIG. 6 is configured to couple the second input terminal 132 to the second input 126 of the comparator 122 when the single-ended communication signal SIG is at the first logic value. Further, the switching circuit 142 couples the second input terminal 132 to the first input 124 of the comparator 122 when the single-ended communication signal CMP is at the second logic value. The offset inverter 140 is also configured to invert the comparison signal CMP based on the single-ended communication signal SIG. For example, the offset inverter 140 illustrated in FIG. 6 includes an XOR gate 144 with a first input coupled to the output of the comparator 122, a second input coupled output of the debouncer 138, and an output coupled to the input of the debouncer 138. Together, the switching circuit 142 and the XOR gate 144 invert both the input and the output of the comparator 122 to preserve overall polarity.

Figure 7:
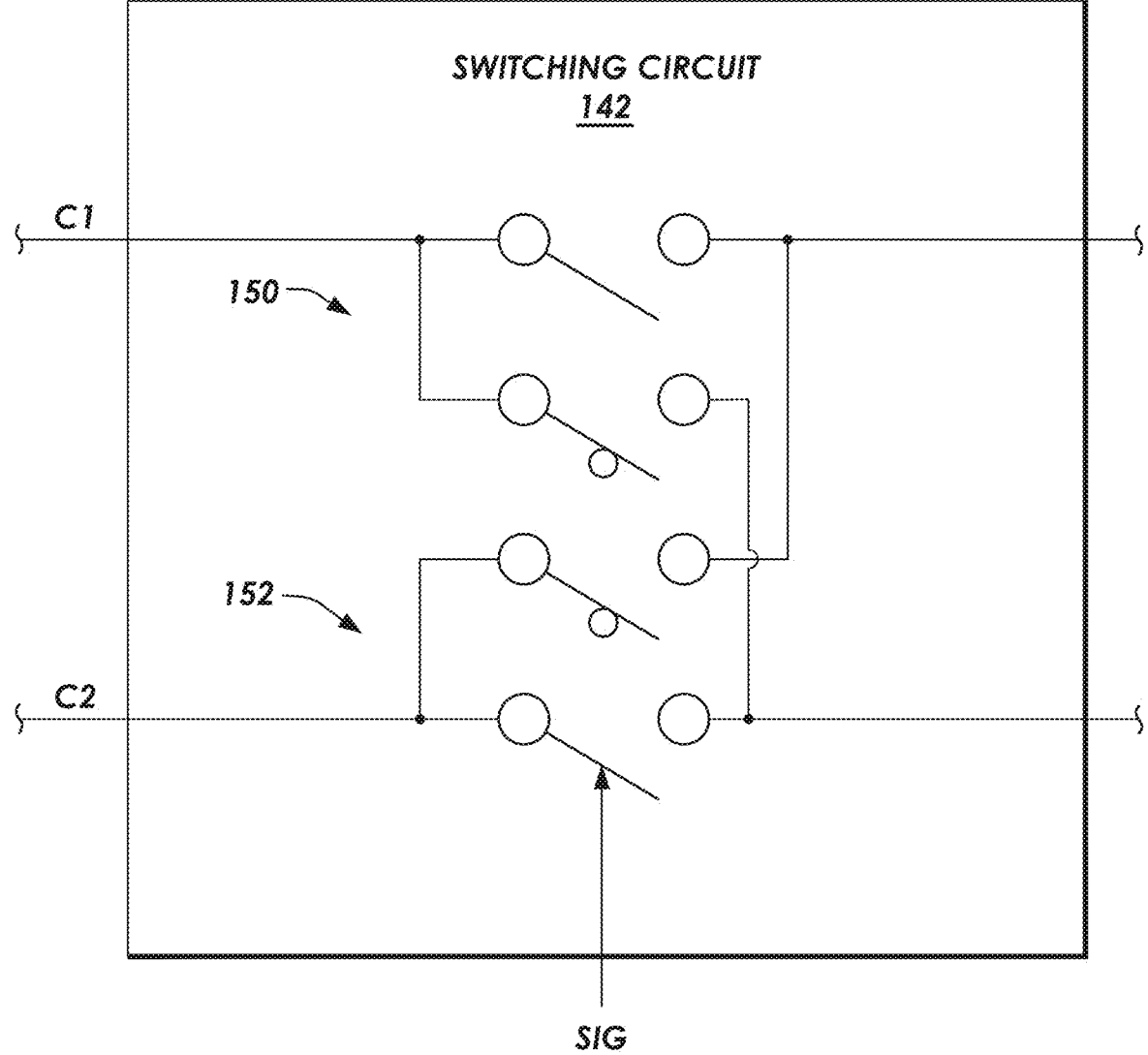
FIG. 7 is a schematic of an example of a switching circuit in accordance with some implementations.

FIG. 7 is a schematic diagram of an example of the switching circuit 142 in accordance with some implementations. The switching circuit 142 illustrated in FIG. 7 includes a first pair of switches 150 and a second pair of switches 152. The first pair of switches 150 and the second pair of switches 152 may include low-voltage switches such as metal-oxide-semiconductor field-effect transistors or other types of transistors (for example, bi-polar junction transistors). The switching circuit 142 may include fewer components, additional components, or different components in different configurations than the switching circuit 142 illustrated in FIG. 7.

The first pair of switches 150 is coupled to the first input terminal 130 via the first resistor 134 to receive the first component C1 of the differential communication signal therefrom. The first pair of switches 150 is configured to couple the first input terminal 130 to the first input 124 or the second input 126 of the comparator 122 based on the single-ended communication signal SIG. For example, the first pair of switches 150 may couple the first input terminal 130 to the first input 124 of the comparator 122 when the single-ended communication signal SIG is a first value and to the second input 126 of the comparator 122 when the single-ended communication signal SIG is a second value.

The second pair of switches 152 is coupled to the second input terminal 132 via the first resistor 136 to receive the second component C2 of the differential communication signal therefrom. The second pair of switches 152 is configured to couple the second input terminal 132 to the first input 124 or the second input 126 of the comparator 122 based on the single-ended communication signal SIG. For example, the second pair of switches 152 may couple the second input terminal 132 to the second input 126 of the comparator 122 when the single-ended communication signal SIG is the first value and to the first input 124 of the comparator 122 when the single-ended communication signal SIG is the second value.

FIG. 8A is a plot of an example of the comparison signal CMP generated by the comparator 122 when the comparator 122 has a positive voltage offset. The plot in FIG. 8A also includes an example of the single-ended communication signal SIG generated by the debouncer 138. As illustrated in FIG. 8A, the comparison signal CMP toggles from a low value to a high value when the input crosses through a first voltage Voff1 that is greater than zero volts. As also illustrated in FIG. 8A, the single-ended communication signal SIG toggles from a logic 0 value to a logic 1 value after the comparison signal CMP is at the high value for longer than the debouncing time Tdebounce. When the single-ended communication signal SIG toggles from the logic 0 value to the logic 1 value, the switching circuit 142 swaps the first input 124 and the second input 126 of the comparator 122 and the XOR gate 144 inverts the comparison signal CMP, resulting in inverting the voltage offset of the comparator 122. Thus, the comparison signal CMP toggles from the high value to the low value when the input later crosses through a second voltage Voff2 that is less than zero volts, as illustrated in FIG. 8A. The single-ended communication signal SIG toggles from the logic 1 value to the logic 0 value after the comparison signal CMP is at the low value for longer than the debouncing time Tdebounce. When the single-ended communication signal SIG toggles from the logic 1 value to the logic 0 value, the switching circuit 142 again swaps the first input 124 and the second input 126 of the comparator 122 and the XOR gate 144 again inverts the comparison signal CMP, resulting again in inverting the voltage offset of the comparator 122. Thus, the comparison signal CMP will toggle from the high value to the low value when the input again crosses through the first voltage Voff1.

FIG. 8A illustrates that some transient behavior of the comparison signal CMP is possible with durations far less than the debouncing time Tdebounce. As described above, the single-ended communication signal SIG is a debounced version of the comparison signal CMP. Thus, the single-ended communication signal SIG does not change in response to any transient behavior of the comparison signal CMP. Rather, the single-ended communication signal SIG changes in response to rising and falling transitions of the input. Thus, the single-ended communication signal SIG provides an accurate indication of whether the next transition of the input is falling or rising. For example, FIG. 8A illustrates that the single-ended communication signal SIG is at the high value at the beginning of a falling transition and at the low value at the beginning of a rising transition. Thus, by inverting the voltage offset of the comparator 122 when the single-ended communication signal SIG is at the high value, the offset inverter 140 inverts the voltage offset of the comparator 122 for falling transitions of the input. Duty cycle distortion results from the comparator 122 when the comparator 122 trips at different transition magnitudes for rising and falling transitions of the input. However, as illustrated in FIG. 8A, the second voltage Voff2 has the same magnitude as the first voltage Voff1 because the voltage offset of the comparator 122 is inverted for falling transitions of the input. Inverting the voltage offset of the comparator 122 for falling transitions of the input causes the comparator 122 to trip at the same transition magnitude for both rising and falling transitions of the input. Thus, there is no duty cycle distortion because the high time and the low time of the single-ended communication signal SIG generated by the debouncer 138 are substantially equal.

FIG. 8B is a plot of an example of the comparison signal CMP generated by the comparator 122 when the comparator 122 has a negative voltage offset. The plot in FIG. 8B also includes an example of the single-ended communication signal SIG generated by the debouncer 138. As illustrated in FIG. 8B, the comparison signal CMP toggles from a low value to a high value when the input crosses through a third voltage Voff3 that is less than zero volts. As also illustrated in FIG. 8B, the single-ended communication signal SIG toggles from a logic 0 value to a logic 1 value after the comparison signal CMP is at the high value for longer than the debouncing time Tdebounce. When the single-ended communication signal SIG toggles from the logic 0 value to the logic 1 value, the voltage offset of the comparator 122 is inverted from the third voltage Voff3 to a fourth voltage Voff4. Thus, the comparison signal CMP toggles from the high value to the low value when the input crosses through the fourth voltage Voff4, as illustrated in FIG. 8B. The single-ended communication signal SIG toggles from the logic 1 value to the logic 0 value after the comparison signal CMP is at the low value for longer than the debouncing time Tdebounce. When the single-ended communication signal SIG toggles from the logic 1 value to the logic 0 value, the voltage offset of the comparator 122 is inverted from the fourth voltage Voff4 to the third voltage Voff3. Thus, the comparison signal CMP will toggle from the high value to the low value when the input again crosses through the third voltage Voff3. As illustrated in FIG. 8B, the fourth voltage Voff4 has the same magnitude as the third voltage Voff3 because it is an inherent property of the comparator 122. Thus, the high time and the low time of the single-ended communication signal SIG generated by the debouncer 138 are still substantially equal.

FIG. 9 is a flow diagram of an example of a method 200 for receiving a signal in accordance with some implementations. For simplicity of explanation, the method 200 is depicted in FIG. 9 and described as a series of operation. However, the operations can occur in various orders and/or concurrently, and/or with other operations not presented and described herein. At block 202, a differential communication signal is received. The differential communication signal includes the first component C1 and the second component C2. The differential communication signal may be received by the lighting unit 102, the local controller 112, or the receiver 120. At block 204, the comparator 122 generates a comparison signal CMP by comparing the first component C1 and the second component C2. At block 206, the single-ended communication signal SIG is generated by applying the debouncing time Tdebounce to the comparison signal CMP. For example, the debouncer 138 may generate the single-ended communication signal SIG by applying the debouncing time Tdebounce to the comparison signal CMP including the all1/all0 detection. At block 208, the voltage offset of the comparator 122 is inverted based on the single-ended communication signal. For example, the offset inverter 140 may apply the first component C1 of the differential communication signal to the first input 124 or the second input 126 of the comparator 122 based on the single-ended communication signal SIG. Further, the offset inverter 140 may apply the second component C2 of the differential communication signal to the first input 124 or the second input 126 of the comparator 122 based on the single-ended communication signal SIG. In addition, the offset inverter 130 may invert the comparison signal CMP based on the single-ended communication signal SIG. Inverting the voltage offset of the comparator 122 based on the single-ended communication signal preserves the overall polarity of the comparison function.

Figure 10:
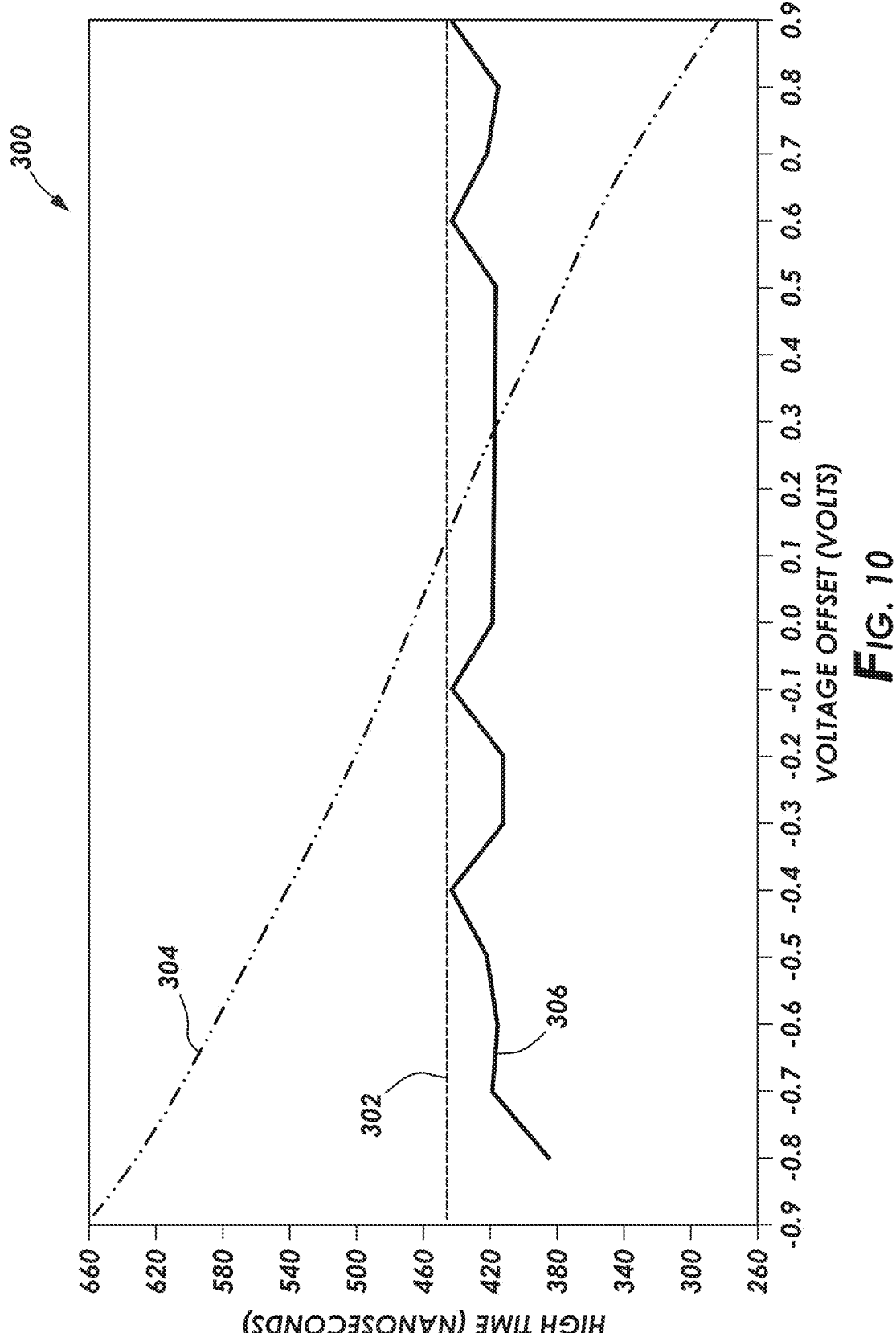
FIG. 10 is a graph of an example of simulation results of high times for outputs of comparators with different voltage offsets in accordance with some implementations.

FIG. 10 is a graph 300 of an example of simulation results of high times for the outputs of different comparators with a 900 nanosecond input square wave and a 32. Megahertz clock signal versus the voltage offset of the comparator 122. The graph 300 in FIG. 10 includes a first plot 302 of an example of the high time for the output of a comparator under ideal conditions with no voltage offset or debouncing. As illustrated by the first plot 302 in FIG. 10, under ideal conditions, the high time for the output of a comparator is equal to about 450 nanoseconds and independent of the voltage offset of the comparator 122. The graph 300 in FIG. 10 also includes a second plot 304 of an example of the high time for the output of a standard comparator with different voltage offsets. As illustrated by the second plot 304 in FIG. 10, the high time for the output of the standard comparator decreases in a substantially linear fashion as the voltage offset increases. The graph 300 in FIG. 10 further includes a third plot 306 of an example of the high time for the output of the comparator 122 described herein with different voltage offsets. As illustrated by the third plot 306 in FIG. 10, for most voltage offsets, the high time for the output of the comparator 122 is either substantially equal to the ideal value of 450 nanoseconds or about one clock pulse below the ideal value. Due to the debouncing, the time resolution at the output is defined by the clock speed of the debouncer 138.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for receiving a signal, the method comprising:

receiving a differential communication signal including a first component and a second component;

generating, with a comparator, a comparison signal by comparing the first component and the second component;

generating a single-ended communication signal by applying a debouncing time to the comparison signal; and inverting a voltage offset of the comparator based on the single-ended communication signal.

2. The method of claim 1, wherein inverting the voltage offset of the comparator based on the single-ended communication signal further includes:

applying the first component of the differential communication signal to a first or a second of two inputs of the comparator based on the single-ended communication signal, applying the second component of the differential communication signal to the first or the second of the two inputs of the comparator based on the single-ended communication signal, and inverting the comparison signal based on the single-ended communication signal.

3. The method of claim 2, wherein applying the first component of the differential communication signal to the first or the second of the two inputs of the comparator based on the single-ended communication signal further includes applying the first component of the differential communication signal to:

the first of the two inputs of the comparator when the single-ended communication signal is at a first logic value, and the second of the two inputs of the comparator when the single-ended communication signal is at a second logic value, and wherein applying the second component of the differential communication signal to the first or the second of the two inputs of the comparator based on the single-ended communication signal further includes applying the second component of the differential communication signal to:

the second of the two inputs of the comparator when the single-ended communication signal is at the first logic value, and the first of the two inputs of the comparator when the single-ended communication signal is at the second logic value.

4. The method of claim 1, wherein generating the single-ended communication signal by applying the debouncing time to the comparison signal further includes:

detecting that the comparison signal is at a first logic value for longer than the debouncing time, setting the single-ended communication signal to the first logic value upon detecting that the comparison signal is at the first logic value for longer than the debouncing time, detecting that the comparison signal is at a second logic value for longer than the debouncing time, and setting the single-ended communication signal to the second logic value upon detecting that the comparison signal is at the second logic value for longer than the debouncing time.

5. The method of claim 1, further comprising decoding the single-ended communication signal with a time based coding scheme.

6. A receiver, comprising:

a first input terminal for receiving a first component of a differential communication signal;

a second input terminal for receiving a second component of the differential communication signal;

a comparator configured to generate a comparison signal by comparing the first component and the second component of the differential communication signal;

a debouncer configured to generate a single-ended communication signal by applying a debouncing time to the comparison signal; and an offset inverter configured to:

couple the first input terminal to a first or a second of two inputs of the comparator based on the single-ended communication signal, couple the second input terminal to the first or the second of the two inputs of the comparator based on the single-ended communication signal, and invert the comparison signal based on the single-ended communication signal.

7. The receiver of claim 6, wherein the debouncer includes:

a debouncing circuit configured to generate a first signal or a second signal based on the inverted comparison signal, and a set-reset flip-flop configured to generate the single-ended communication signal based on the first signal and the second signal.

8. The receiver of claim 6, wherein the offset inverter includes an XOR gate including:

a first input coupled to an output of the comparator, a second input coupled to an output of the debouncer, and an output coupled to an input of the debouncer.

9. The receiver of claim 6, wherein the offset inverter includes a switching circuit including:

a first pair of switches configured to couple the first input terminal to the first or the second of the two inputs of the comparator based on the single-ended communication signal, and a second pair of switches configured to couple the second input terminal to the first or the second of the two inputs of the comparator based on the single-ended communication signal.

10. The receiver of claim 6, wherein, to couple the first input terminal to the first or the second of the two inputs of the comparator based on the single-ended communication signal, the offset inverter is further configured to couple the first input terminal to:

the first of the two inputs of the comparator when the single-ended communication signal is at a first logic value, and the second of the two inputs of the comparator when the single-ended communication signal is at a second logic value, and wherein, to couple the second input terminal to the first or the second of the two inputs of the comparator based on the single-ended communication signal, the offset inverter is further configured to couple the second input terminal to:

the second of the two inputs of the comparator when the single-ended communication signal is at the first logic value, and the first of the two inputs of the comparator when the single-ended communication signal is at the second logic value.

11. The receiver of claim 6, further comprising:

a first resistor coupled in series between the first input terminal and the offset inverter, and a second resistor coupled in series between the second input terminal and the offset inverter.

12. A system, comprising:

a master controller configured to send a differential communication signal;

a communication bus; and a local controller communicably coupled to the master controller via the communication bus, the local controller configured to:

receive the differential communication signal, generate, with a comparator, a comparison signal by comparing a first component of the differential communication signal and a second component of the differential communication signal, generate a single-ended communication signal by applying a debouncing time to the comparison signal, and invert a voltage offset of the comparator based on the single-ended communication signal.

13. The system of claim 12, wherein the local controller is further configured to decode the single-ended communication signal with a time based coding scheme.

14. The system of claim 12, wherein the communication bus includes a controller area network bus.

15. The system of claim 12, wherein the system is a lighting system, wherein the lighting system further comprises a lighting unit including:

a plurality of light sources, and the local controller, wherein the local controller is configured to control the plurality of light sources based on the single-ended communication signal.

16. The system of claim 15, wherein the lighting system is an automobile or a vehicle.

17. The system of claim 12, wherein, to invert the voltage offset of the comparator based on the single-ended communication signal, the local controller is further configured to:

apply the first component of the differential communication signal to a first or a second of two inputs of the comparator based on the single-ended communication signal, apply the second component of the differential communication signal to the first or the second of the two inputs of the comparator based on the single-ended communication signal, and invert the comparison signal based on the single-ended communication signal.

18. The system of claim 17, wherein, to apply the first component of the differential communication signal to the first or the second of the two inputs of the comparator based on the single-ended communication signal, the local controller is further configured to apply the first component of the differential communication signal to:

the first of the two inputs of the comparator when the single-ended communication signal is at a first logic value, and the second of the two inputs of the comparator when the single-ended communication signal is at a second logic value, and wherein, to apply the second component of the differential communication signal to the first or the second of the two inputs of the comparator based on the single-ended communication signal, the local controller is further configured to apply the second component of the differential communication signal to:

the second of the two inputs of the comparator when the single-ended communication signal is at the first logic value, and the first of the two inputs of the comparator when the single-ended communication signal is at the second logic value.

19. The system of claim 12, wherein the debouncing time is based on a predetermined slope of the differential communication signal and a maximum voltage offset of the comparator.

* * * * *